United States Patent Office 3,240,698
Patented Mar. 15, 1966

3,240,698
CATALYTIC PROCESSES AND CATALYSTS
THEREFOR
Robert J. Leak, Wappingers Falls, and Harry J. Le Bleu, Highland Falls, N.Y., assignors to Texaco Inc., New York, N.Y., a corporation of Delaware
No Drawing. Filed Dec. 27, 1962, Ser. No. 247,488
6 Claims. (Cl. 208—143)

This application is a continuation-in-part of our co-pending U.S. patent application Serial No. 149,495, filed November 2, 1961, now abandoned.

This invention relates to improvements in catalytic processes. In its more specific aspects, it relates to an improved structure for use in catalytic processes, to the method of making same, and to improved processes employing said improved catalyst structures.

In catalytic processes employing beds of solid particulate catalysts, reactants are passed through a bed of catalyst particles, beads or pellets. In many such processes involving reactions of organic materials at elevated temperatures, carbonaceous deposits accumulate on the catalyst. This deposition of carbonaceous material, commonly known as fouling of the catalyst, varies with the reactants, the reaction products, the conditions of the process, and the catalyst, so that certain types of reactions may be worse offenders than others. Fouling may be particularly excessive when the reactants or product remain in contact with the catalyst for a relatively long time. When a porous catalyst is used, the reactants diffuse into the interior or central portion of the catalyst particles and may be retained for an excessive period of time whereupon decomposition of the reactants and products result in fouling the catalyst. Fouling results not only in a decrease in catalyst activity and loss in selectivity, but also results in intensification of the heat transfer problem in the catalyst thereby resulting in local overheating or "hot spots," particularly during regeneration of the catalyst.

This invention has, therefore, as its broad object to provide an improved process for catalytic conversion reactions employing a catalyst structure characterized by relatively high activity over long periods of use.

Heat transfer and temperature control in a catalyst bed often are difficult problems by reason of the heat of reaction which accompanies numerous catalytic reactions. Thus, in an exothermic reaction, for example, the heat evolved in processing may result in formation of local over-heating or "hot spots" unless distributed substantially uniformly throughout the catalyst bed or otherwise dissipated from the reaction zone. Generally it is desirable or essential to maintain the reaction temperature within a predetermined range in order to obtain the maximum yield of desired products. Local overheating and temperature variations in the catalyst bed are therefore deleterious and may result in excessive coking of the reactants, inactivation of the catalyst, or otherwise cause undesired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or high endothermic reactions, it has been proposed to incorporate pieces of metal or other suitable heat conductive solid material in the fixed catalyst bed to facilitate heat transfer to the surroundings. Heat transfer and temperature control of the catalyst bed have been achieved by employing a gaseous or liquid heat-transfer medium usually circulated through a jacket surrounding the reactor. The reactants may be diluted with steam or an inert gas as a further means of achieving temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of time. Notwithstanding this precaution, uncontrollable local overheating and temperature variations in the catalyst bed may occur.

This invention has as another object to provide a catalyst structure which affords an effective means for adequately controlling the thermal conditions of the reaction thereby minimizing, or substantially eliminating, temperature variations in the catalyst bed and local overheating and fouling. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. This eliminates a substantial portion of the structural and supporting members of the reactor, permit compactness in design and decreases substantially the capital costs and operating costs. It is significant that the foregoing and other objects are realized without diminishing the flow rates of the reactants, but on the contrary, in many catalytic processes, the reaction rates may be greatly increased without any appreciable decrease in product yield.

These together with other objects and advantages will be apparent to one skilled in the art upon reading the following description.

The novel structure of our invention involves broadly a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. A catalyst material is deposited upon the film of alumina adhering to the substrate, which material may be deposited in a form possessing catalytic activity or capable of being rendered susceptible of catalytic activity by subsequent treatment, as explained more fully hereinbelow. Depending to a large extent upon the catalyst material employed, our invention was found to be extremely advantageous and economical for use in a number of catalytic processes, conducted in either liquid or vapor phase.

In accordance with this invention, the substrate employed in the catalyst structure is provided with an adherent film of alumina formed by contacting the substrate with a solution of an alkali metal aluminate, e.g., sodium aluminate. The substrate is preferably of extended dimensions, and is particularly of a length and geometric surface area substantially greater than that of discrete particles. The substrate employed in the structure of our invention is not restricted to any particular configuration nor to any particular material. The substrate may be formed of a metal or non-metal suitable for use in a catalytic reactor, and may include such materials as steel, stainless steel, nickel, or titanium, including sintered metal materials, or refractory or ceramic materials including, for example, high melting glass, refractory metal oxides, e.g., magnesia and silica, or refractory metal silicates or carbides. The configuration of the substrate may include bars, balls, chain, mesh, plates, saddles, sheet, tubes, wire or the like.

Although the invention is described herein in detail with reference to employing a sodium aluminate solution, alternatively, but less desirably, alumina coatings may be deposited on supporting surfaces also from aqueous solutions of aluminates of potassium, lithium, rubidium or cesium.

In preparing the catalytic structure, the substrate is contacted with an aqueous solution of sodium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate appears to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperatures, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate), and these may be effective as seed material to start deposition. It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate solution may be obtained or prepared by known methods. Thus, for example, metallic aluminum may be dissolved in a relatively strong aqueous solution of sodium hydroxide, or, where deemed desirable alumina may be dissolved in an aqueous solution of sodium hydroxide, or commerical sodium aluminate may be dissolved in water.

Desirably, the concentration of the sodium aluminate solution is not less than 0.5 molar, and preferably is in the range of 1 to 5 molar, in order that a film of alumina will be deposited or formed in sufficient depth to be serviceable and within a resonable period of time, e.g., 1 to 12 hours. More concentrated solutions may be employed, but are not generally more advantageous. Preferably, metallic aluminum is maintained in contact with the solution during deposition to replenish the sodium aluminate. Concentrations of sodium aluminate as low as about 0.1 molar are effective for deposition of the alumina film from a solution of a strong base, e.g., sodium hydroxide provided that free aluminum is present in the solution during the deposition of the film. As explained above, the temperature of the solution determines to a considerable extent the particular alumina phase formed. Thus, for example, in depositing a film of alpha alumina trihydrate on the substrate it is desirable to employ a solution having a temperature above 125° F., and preferably about 175 to 210° F.

The substrate may be contacted with the solution of sodium aluminate as by immersing the substrate when in particulate or filament form, e.g., saddles, spheres, wire screen or steel wool, mesh, etc., in the solution; in forming the alumina film on the interior wall of a tube, sodium aluminate solution is added to the tube and permitted to stand therein, preferably in a vertical position, in order to provide a film of uniform thickness. The resulting film of alumina formed on the substrate should be of sufficient thickness to provide adequate capacity for retaining the catalyst deposited thereon. In general, the film of alumina formed should not be substantially thinner than about 1 mil and preferably not less than about 4 mils. Deposits of alumina of almost any thickness are possible but coatings thicker than 150 mils are generally not advantageous. Usually films 4 to 30 mils thick are desirable.

In the preferred embodiment of this invention, the alumina in hydrate form deposited on the substrate as an adherent film is subjected to heating to drive off at least part of the water of hydration thereby resulting in the transformation to a lower state, or degree, of hydration and also to a higher density alumina. Such transformation accompanying heating is well known in the art, and may be found discussed in "Alumina Properties," by J. W. Newsome et al. (Aluminum Company of America, 1960, Second Revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, beta alumina trihydrate may be transferred to eta alumina upon heating in dry air at a slow rate to about 500 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and, more importantly, resulting in a carrier characterized by a high adsorptive property.

The method utilized in depositing the catalyst material upon the alumina film is dependent to some extent upon the particular catalyst material employed. For example, a metal-containing catalyst material may be deposited by chemically reducing a solution containing a soluble compound of the catalyst material in the presence of the substrate bearing the alumina film under such conditions as to effect a substantially uniform deposition of the catalyst material upon the alumina surface. The method is disclosed in copending U.S. patent application Serial No. 112,508, now Patent No. 3,147,154, of Edward L. Cole and Edwin C. Knowles, filed May 25, 1961. Chemical reduction of the deposit is particularly useful in those instances where the elemental metal or its intermediate product of reduction, exhibits the required catalytic activity, or where a deposit of the metal may be rendered active upon subsequent treatment. In several cases, a compound of the metal forms, with a stabilizing agent, a soluble complex which may be readily reduced to the elemental metal or its intermediate product of reduction with a suitable agent, preferably a reducing gas, for example, hydrogen. Suitable stabilizing agents include complexing agents which form soluble complex ions of the co-ordinate complex type, sequestering agents, chelating agents, dispersants and detergents. Thus, compounds or salts of numerous metals form with ammonia, for example, a co-ordination type complex. These metals usually include those from Groups I, VI and VIII of the Periodic Table of Elements, for example, copper, silver, gold, chromium, molybdenum, tungsten, iron, cobalt, nickel, platinum, palladium, osmium and iridium, but may also embrace other elements including those from Groups II, III, IV, V and VII of the Periodic Table, for example, zinc, cadmium, mercury, tin, zirconium vanadium and manganese, and combinations thereby. The deposit is generally calcined and activated by subsequent treatment, for example, oxidizing or sulfiding of the catalyst metal or metals.

The non-metallic ion or the anion of the metal compound or salt which is to be precipitated from the ammoniacal solution may be of any inorganic acid or strong organic acid which forms a soluble salt of the metal and is not reduced under precipitation conditions. Those anions usually employed include, sulfate, chloride, nitrate, carbonate, chromate and vanadate, and the organic anion generally being acetate. The solvent generally used is an aqueous solution, but suitable organic solvents, including alcohols, aldehydes, ethers, ketones, toluene and pyridine may be used, as may liquid ammonia.

Although ammonia is the preferred stabilizing agent, certain other stabilizing agents may be employed. Other suitable stabilizing agents include the organic primary, secondary and tertiary amines, such as methylamine, ethylenediamine and diethylenetriamine. In addition, stabilizing agents may include phosphates, as well as citrate, acetate, oxalate, tartrate, o-phenanthroline, thiocyanate, thiosulfate, thiourea, pyridine, quinoline and cyano groups. Still further useful complex formations include the chloro, hydroxo and aquo complexes, such as the aquo-ammonia complexes. Olefin and olefin-like compounds are also useful, and may include, for example, ethylene, propylene, butadiene, etc., as well as the unsaturated cyclo compounds such as cyclohexene and styrene. However, the olefin and olefin-like compounds are desirably employed in a non-aqueous solvent, for example, benzene, toluene, pyridine, acetone and ether.

The catalyst material may be deposited on the alumina film by the action of a reducing agent, preferably hydrogen, on a solution containing a soluble complex of the catalyst material, such as an ammoniacal solution of a salt of the catalyst material. The temperature and pressure employed in the reducing step depend upon the material undergoing reduction and may vary over a wide range. Thus, for example, platinum may be deposited from ethylene chloroplatinate in benzene by reduction with hydrogen at room temperature and atmospheric pressure. However, with numerous other metals, reduction proceeds advantageously at elevated temperatures which may range up to 500° F. and under a partial pressure of as high as 4000 pounds per square inch or higher. It should be understood that other reducing gases such as carbon monoxide may be used with satisfactory results, as may other reducing agents such as hydrazine, hydroxylamine, glyoxal, formaldehyde or sulfur dioxide.

By way of example, elemental platinum useful as a catalyst for oxidation of ammonia or as a reforming catalyst may be deposited on the alumina film formed on the substrate member from an ammoniacal solution of a platinum salt, e.g., the chloride salt or chloroplatinic acid, by reducing the solution with hydrogen at elevated temperature and pressure. Similarly, a silver deposit useful as a catalyst in the oxidation of ethylene may be formed on the alumina film of the substrate from an ammoniacal solution of silver sulfate. A deposit of nickel or of molybdenum similarly formed may be sulfided with hydrogen sulfide gas at elevated temperature and the metal sulfide catalyst formed then used in hydrogenation processes. A deposit of chromium may be oxidized for use as a catalyst in polymerization of olefins, or a deposit of iron may be oxidized for use in the reaction of carbon monoxide with hydrogen to produce hydrocarbons.

A mixture of metal salts, all of which form complex ions with ammonia, may be used for forming a deposit of more than one catalytic element. By such means, a nickel-molybdenum catalyst or cobalt-molybdenum- nickel catalyst may be deposited on the oxide film for use as hydrogenation catalysts. Also, nickel-molybdenum or nickel-tungsten salts may be complexed in a citrate solution, and precipitated from solution with hydrogen, as described above. The codeposits may then be calcined or otherwise activated.

As an alternative procedure, the added catalyst material may be impregnated on the alumina film by contacting the oxide coated substrate with a solution containing the catalyst material. Generally, this is accomplished by immersing the alumina coated substrate in a solution of a salt of the catalyst material. The conditions for impregnating, i.e., concentration, temperature, time and pH, will depend largely upon the material employed and upon the amount of catalyst material required. The deposit is then calcined and activated in place as by oxidizing, reducing, sulfiding, etc. By this method, the alumina film may be impregnated with such catalyst material as salts or compounds of metals from Groups I through VIII of the Periodic Table, and particularly, Groups I, IV, VI and VIII, including for example, copper, silver, zinc, tin, vanadium, chromium, molybdenum, manganese, cobalt, and iron. By way of illustration, the alumina film may be impregnated with ammonium chromate from an aqueous solution of the salt and the deposit subsequently calcined to form the oxide which is useful in the dehydrogenation of paraffins and olefins to olefins and diolefins and the dehydrogenation of cyclohexane to benzene. The catalyst material may include, as well, phosphate, metaphosphates, perborates, chromates, perchromates, carbonyls, carbonates, thiocyanates, vanadates, etc. Copper pyrophosphate may be impregnated on the alumina film, calcined, and used as a catalyst in the hydration of alcohol or acetylene to acetaldehyde.

Although aqueous solutions are usually employed, the catalyst material may be impregnated on the alumina carrier from a non-aqueous solution, particularly acetone, ethanol and the like. Thus, for example, the alumina film may be impregnated with molybdenum blue from an acetone solution of the salt or with zinc chlorate hexahydrate disolved in alcohol. The molybdenum deposit, upon calcining, may be a useful catalyst in the hydrogenation of lube oil, and the zinc deposit, after calcining, may be employed in the dehydration of alcohol to an olefin. In addition, the catalyst material may be impregnated onto the alumina carrier from the vapor phase, as for example by thermally decomposing a metal carbonyl, such as molybdenum hexacarbonyl, and the deposit calcined to the oxide which, in turn, may be sulfided by conventional practice.

In still another method, the catalyst material may be deposited on the alumina film by pasting as from a slurry of the material. Zinc oxide, for example, useful as a dehydrogenation catalyst, may be pasted on the alumina coated substrate, and then calcined for use as a catalyst. A co-deposit of aluminum oxide and aluminum nitrate may be pasted on the oxide film from a slurry of the material. After calcining, the co-deposit may be used in the dehydration of an alcohol or in the cracking of a hydrocarbon.

In order to assure deposition of the desired quantity of the catalyst material, it may be necessary in some cases to repeat the particular process employed in depositing the material, including the successive steps of deposition, and drying or activation where required. Depending on the added catalyst deposit and its intended use, the alumina film may be substantially inert or it may have a synergistic effect upon the catalyst material. It should be understood that a suitable promoter or inhibitor may be added to the catalyst material, or incorporated with the reactants undergoing catalytic treatment. For example, a reforming catalyst such as platinum, may be treated with a halide, e.g., HF or $BF_3$, to improve or promote the catalytic reaction.

It will be observed that the choice of added catalyst material depends upon the use contemplated. Thus, the catalytic structure of our invention may be advantageously employed in a wide variety of catalytic processes including, for example, isomerization, polymerization or alkylation of paraffinic and aromatic hydrocarbons. In addition, the catalytic structure may be useful in the hydrogenation of unsaturated organic compounds, e.g., unsaturated hydrocarbons, vegetable oils, animal fats; the synthesis of hydrocarbons and alcohols from carbon monoxide and hydrogen; the synthesis of ammonia; the hydration of olefins; the dehydrogenation of paraffins and olefins or oxidation of various organic compounds, as, for example, in producing an aldehyde or ketone from the corresponding alcohol, the oxidation of ammonia to nitrogen dioxide for the production of nitric acid; various cracking reactions; halogenation-dehalogenation processes; and the like.

Referring now in greater detail to the catalytic structure of our invention, and the attendant advantages, the substrate is initially provided with an alumina film which is relatively thin as compared to the substrate. The substrate is not restricted to any particular configuration, and may include bars, balls, chain, plates, saddles, sheet, strip, tubes, wire, mesh, chips, shavings, filaments or the like, the member of the substrate preferably of extended dimensions desirably of not less than about $\frac{1}{16}$ inch in its maximum dimension, and of sufficient thickness on which the alumina film may be adequately produced. Generally, an alumina film of about 10 to 100 mils is sufficient, but thicker film or thinner film may be employed where desired. The thin alumina film with the added catalyst material defines the depth of the catalyst bed, and therefore limits the extent of diffusion of the reactants through the pores and openings in the bed to this shallow depth. As a consequence, substantially all of the catalyst material is exposed to the reactants, and entrapment of the reactants in the catalyst is minimized or substantially eliminated. In this manner, we readily achieve with less catalyst material a reactive capacity equal to, or greater than, that accomplished by conventional catalysts.

In a preferred embodiment of this invention, a metal is employed as the substrate of the catalytic structure thereby rendering the structure capable of operating under substantially isothermal conditions. During a catalytic process, heat transfer in the catalyst bed is readily accomplished by means of the metal substrate, which is preferably of extended dimensions. Depending on the nature of the reaction, heat may be extracted from, or supplied to, the reactor through the metal substrate thereby providing an adequate means for controlling temperature conditions in the catalyst bed. Thus, in an exothermic process, for example, the metal substrate will conduct the heat to the surroundings of the reactor, and the excess heat extracted therefrom preferably by means of a cooling medium employed in the heat exchange relation with the reactor.

In the dehydrogenation of hydrocarbons, for example, dehydrogenation of cetane, dehydrogenation of $C_3$–$C_5$ paraffins and olefins, etc. chromia-alumina catalysts prepared by depositing an alumina film on stainless steel chips in accordance with the present invention and impregnating the alumina with chromium salts, for example, chromium trioxide, has been found to give superior results as compared with a conventional commercial chromia-alumina catalyst comprising pellets of alumina impregnated with chromium trioxide.

In a preferred embodiment of our invention, the catalytic structure is provided in the form of a tube of relatively small inside diameter. The inside diameter of the tube, in general, may range from about 0.05 to 0.75 inch, and in some cases up to 2 inches, but is dependent upon the type of catalytic reaction, materials undergoing reaction and the capacity of the pumping mechanism to accomplish sufficient turbulence. At least one surface or wall of the tube, and preferably the interior wall of the tube, is provided with an alumina film as described above, and added catalyst material is deposited thereon.

The tube through which the reactants pass is preferably of a continuous length sufficient to accomplish the desired catalytic reaction in economic yields, but may be coiled to conserve space. The length of the tube may depend to some extent upon the reaction contemplated, and may be determined by one skilled in the art. The wall of the reactor provides adequate support and mechanical strength for the catalyst, and thereby affords a substantially self-sustaining structure. With larger reaction tubes, e.g., 2 inches or more in diameter, it is preferable to pack the tube with supporting substrate, e.g., coarse stainless steel wool, and simultaneously coat both the interior of the tube and the packing material with alumina, after which catalytic material is deposited on the alumina.

It will be observed that when a metal tube is employed, the tube provides an adequate means to control the temperature or heat transfer to or from the catalyst. The metal wall, being a good heat conductor, may be employed as a heat exchanger notwithstanding the relatively thin alumina film. A suitable heat exchange medium may be applied to the exterior wall of the metal tube, for example. During processing, the heat evolved in the catalyst bed is readily conducted by the wall of the tube to the surroundings where it is dissipated or absorbed by a heat exchange medium. On the other hand, the tubular wall may be employed to transfer heat from a heating medium in the case of an endothermic reaction. It should be understood that a number of the catalytic tubes may be housed in parallel in a single unit, and, if desired, arranged in contacting relation with a heat exchange medium.

It is of further significance that in the catalytic tube having a relatively small inside diameter, turbulent flow of the reactants passing through the tube is readily maintained. As a consequence, near maximum reaction rates are achieved. In addition, the catalytic structure of our invention markedly reduces the residence time of the reactants in the reactor, as explained above. Consequently, the reactor may be operated at high temperatures, or optimum temperatures, or more importantly, in many cases at higher temperatures and faster reaction rates than those normally encountered in a conventional reactor, without danger of excessive coking or fouling of the catalyst.

The catalytic tube or sheet formed in accordance with the invention is of further advantage in that the reactant gases in certain processes may be caused to pass through the tube or sheet by use of a pervious or permeable tube of sheet, optionally with the application of a pressure differential between the interior and exterior of the tube on opposite sides of the sheet. A porous tube or wall may be formed from the powdered metal, preferably sintered, by known procedures in the field of powder metallurgy. Thus, for example, in a hydrogenation process, hydrogen may be diffused through the tube and into immediate contact with the catalyst surface where reaction occurs, thereby more fully utilizing the reactants and increasing the reaction rates. In other processes, the reactant gases may be caused to pass in or out of the catalyst tube through the permeable wall of the tube.

The following examples will further illustrate our invention.

EXAMPLE I

A sodium aluminate solution was prepared by dissolving 293 grams of sodium hydroxide in 5 liters of water contained in a battery jar, and adding thereto 192 grams of aluminum pills. 250 grams of chrome steel chips measuring $\frac{1}{8}''$ x $\frac{1}{4}''$ were retained in a stainless steel sieve which was immersed in the solution. The solution was maintained at 180° F. by means of a steam plate for about 2 hours. The battery jar was removed from the steam plate, and the solution allowed to stand until a precipitate began to form on the side walls and bottom of the battery jar. The chips retained in the sieve were then agitated by shaking about every ½ hour over a 3 hour period and then permitted to remain in the solution for 15 hours in order that the chips might be uniformly coated. The chips were then removed from the solution, and washed thoroughly with tap water and then with distilled water. The chips having an adherent film of alumina formed thereon were dried gradually to avoid cracking, first at 250° F. for 2 hours, then at 750° F. for 16 hours and finally at 1000° F. for 1 hour. As a result of the heating, the alumina film comprised essentially gamma alumina. The total weight of the coated chips was 286 grams, the alumina film comprising 12.2 percent of the total weight.

The alumina film on the chrome steel chips was impregnated with a zinc oxide-zinc chromite type catalyst as follows:

The solution of catalyst containing material was prepared by first adding to 500 milliliters of boiling water 35 grams of barium nitrate and 356 grams of zinc nitrate hexahydrate, and the resulting solution diluted to 1000 milliliters. The above-prepared chips were soaked in the resulting solution for one hour at 150° F., and the solution then drained from the chips.

A second solution was prepared by dissolving 168 grams of ammonium dichromate in 600 milliliters of water. 250 milliliters of ammonium hydroxide (15.1 N) was added, and the solution was diluted to 1000 milliliters. The previously treated chips were soaked in the second solution for one hour at 150° F., and the solution then drained from the chips. The treated chips were heated in air at 175° F. for 24 hours and then at 300° F. for 10 hours.

A third solution was prepared by dissolving 11 grams of barium nitrate in 500 milliliters of hot water which was diluted with an additional 200 milliliters of water. 123 grams of zinc nitrate and 122 grams of chromium nitrate nonahydrate was added to the solution, and the resulting solution was diluted to 1000 milliliters. The above-treated chips were immersed in 35 milliliters of this third solution which was readily soaked up by the alumina film on the chips. The chips were then heated at 300° F. for one hour in air. This procedure was repeated with increments of 25 milliliters of the third solution until substantially all the solution was soaked up by the alumina-coated chips. After the final soaking, the treated chips were heated in air at 300° F. for one hour, then at 500° F. for 2 hours and subsequently at 1000° F. for one hour.

The prepared chips having the catalyst material impregnated thereon were used in the dealkylation of a light cycle gas oil fraction obtained from a fluid catalytic cracking unit to naphthalene. The gas-oil fraction had a boiling point range of 390 to 545° F., an API gravity of 29° an average molecular weight of 161 and contained 56% by volume aromatic compounds and 0.38% by weight sulfur. The feed charge was processed at about 1200° F., a pressure of 650 p.s.i.g. a liquid volume hourly space velocity of 0.5 and in the presence of hydrogen in a mol ratio of hydrogen to hydrocarbon of 13:1. The naphthalene yield was 15.3 grams per 100 grams of charge.

EXAMPLE II

The catalyst material prepared as in Example I was employed in the dealkylation of an aromatic fraction comprising a blend of 50% by weight toluene and 50% by weight 2-methyl naphthalene to benzene and naphthalene. The dealkylation process was conducted at 1250° F., 650 p.s.i.g. and at a liquid space velocity of 1 v./v./hr. The conversion obtained for toluene to benzene was around 36%, and selectivity for the reaction was about 75%. The conversion for 2-methyl naphthalene to naphthalene was about 60%, and the selectivity for the reaction was about 90%. It is noted that the dealkylation of 2-methyl naphthalene is more difficult than dealkylation of the isomer 1-methyl naphthalene thereby indicating good catalytic activity.

EXAMPLE III

Chrome steel chips were coated with a film of gamma alumina as in Example I. The final weight for the chips was 280 grams, with 10.7% of the total weight comprising the alumina film.

The catalyst containing solution was prepared by first dissolving 42 grams of nickel nitrate hexahydrate in 20 milliliters of water and adding the solution to 50 milliliters of ammonium hydroxide (15.1 N). In preparing a second solution, 20 grams of tungstic acid was added to 80 milliliters of hot water, and 100 milliliters of ammonium hydroxide was added thereto. The two solutions were combined. The alumina coated chips were immersed in small increments of the above prepared solution, and after each soaking the chips were dried at 250° F. for ½ hour in air. This procedure was repeated 11 times, except for the last time the chips were dried at 250° F. for ½ hour, then at 500° F. for ½ hour and then at 950° F. for one hour. The impregnated catalyst material was sulfided by passing a hydrogen sulfide stream over the material at 750° F. for 4 hours to convert the nickel and tungsten compounds to their corresponding sulfides.

The prepared nickel sulfide-tungsten sulfide catalyst on the alumina film deposited on chrome steel chips was used in hydrotreating of an Arabian crude oil having a boiling point range of 132 to 745+ ° F., an API gravity of 34.6°, a sulfur content of 2.38% by weight and a carbon residue of 3.72% by weight. Treatment was effected at 850° F., 1000 p.s.i.g., a liquid volume hourly space velocity of 0.5 and a recycle rate of hydrogen of 6000 s.c.f./bbl. As a result of the hydrotreating process, the sulfur content was markedly reduced to as low as 0.24% and then carbon residue reduced to 0.16%.

EXAMPLE IV

The catalyst material prepared as in Example III was used in the hydrotreating of an unrefined naphthenic pale oil obtained from a Gulf Coast crude having an API gravity of 19°. The conditions employed in the process were 750° F.. 1000 p.s.i.g., a space velocity of 1 v./v./hr. and a hydrogen recycle rate of 6000 s.c.f./bbl. From the results, it was found that the sulfur content was reduced from 0.22% by weight in the feed charge to 0.02% by weight in the product. Further the color of the charge stock employed in the catalytic hydrotreating process improved from 25 as measured on a Lovibond colorimeter employing a ½ inch cell to 10 Lovibond 6 inch cell in the product.

EXAMPLE V

Using the catalyst material of Example III, a cycle gas oil obtained from a fluid catalytic cracking unit having a boiling point range of 494 to 614° F. and an API gravity of 28°, an average molecular weight of 192 and containing 37% by volume aromatic compounds, was hydrotreated under the same conditions as employed in Example IV. As a result of the catalytic treatment, the sulfur content was reduced from 0.31% by weight in the feed charge to 0.01% by weight in the product, and further the color measured in accordance with A.S.T.M. D-1500 was improved from less than 2.0 to less than 0.5.

EXAMPLE VI

The catalyst material of Example III was employed in the hydrotreating of a furfural extract of a cycle gas oil from a fluid catalytic cracking unit having an API gravity of 10.7° and containing 89% by volume aromatic compounds and 11% by volume saturated hydrocarbons. Hydrotreating was effected at 750° F., 2000 p.s.i.g., a liquid space velocity of 0.5 v./v./hr. and a hydrogen recycle rate of 6000 s.c.f./bbl. The product recovered had an aromatic content of 61% and a saturated hydrocarbon content of 38%. It also was found that the sulfur content was reduced from 1.95% by weight in the charge stock to 0.04% by weight in the product.

EXAMPLE VII

A sodium aluminate solution was prepared by dissolving 438 grams of sodium hydroxide and 288 grams of aluminum pills in 5 liters of water contained in a battery jar. 126 grams of ceramic berl saddles were added to the solution, and an alumina coating was formed on the saddles in accordance with the procedure set forth in Example I. The saddles having the alumina coating formed thereon where dried in air at 250° F. for ½ hour and then at 750° F. for 16 hours. The total weight for the alumina coated saddles was 128 grams.

In preparing a catalyst-containing solution, a first solution was prepared by dissolving 75 grams of nickel acetate and 75 grams of cobalt acetate in 600 milliliters of ammonium hydroxide (15.1 N). A second solution was prepared by dissolving 98 grams of ammonium molybdate tetrahydrate in 400 milliliters of ammonium hydroxide (15.1 N) and the second solution was combined with the first solution.

The berl saddles having the alumina film formed thereon were immersed in small increments of the above prepared solution whereby the solution was absorbed by the alumina film. 8 increments of solution were employed in this soaking procedure. After each soaking, the treated saddles were heated at 500° F. for 15 minutes in air. The nickel-cobalt-molybdenum type catalyst material impregnated on the alumina film was sulfided in a hydrogen sulfide stream at 700° F. and for 6 hours to convert the metal compounds to their corresponding sulfides.

The berl saddles impregnated with the catalyst were used in the hydrogenation of a wax distillate fraction obtained upon distillation of a mixed based Mid-Continent crude which had been furfural refined to remove a substantial portion of aromatics. The catalytic reaction was carried out at a temperature of 650° F., at 1000 p.s.i.g., and a liquid volume hourly space velocity of 0.5. From the results, it was found that the color of the charge stock employed in the catalytic hydrogenation treatment improved from 225 as measured on a Lovibond colorimeter employing a 6 inch cell to 10 Lovibond 6 inch cell in the product.

EXAMPLE VIII

The nickel sulfide-cobalt sulfide-molybdenum sulfide catalyst impregnated on an alumina film coated on berl saddles in accordance with the procedure outlined in Example VII was used in the hydrogenation of a vacuum pipe still gas oil obtained from the distillation of a crude oil and having a boiling point range of 490 to 760+ ° F. and an API gravity of 24.6°. The catalytic reaction was conducted at about 650° F., 1000 p.s.i.g. and at a space velocity of 0.5 v./v./hr. The charge stock had a sulfur content of 0.85% by weight, and a carbon residue of 0.40% by weight. As a result of the catalytic treatment, the sulfur content was markedly reduced to 0.11% and the carbon residue reduced to 0.08%.

EXAMPLE IX 250 grams of chrome steel chips were coated with an alumina film as described in Example I. It was found that 41 grams of alumina were deposited on the chips. A catalyst containing solution was prepared by first dissolving 26 grams of nickel acetate tetrahydrate in 100 milliliters of water and adding the solution to 50 milliliters of ammonium hydroxide (15.1 N). A second solution was prepared by adding 26 grams of tungstic acid to 100 milliliters of water and adding thereto 50 milliliters of ammonium hydroxide. The two solutions were combined, and the resulting solution was diluted to 500 milliliters.

The alumina coated chips were placed in an autoclave and covered with 250 milliliters of the above prepared catalyst-containing solution. The autoclave was flushed with hydrogen, and then pressurized with hydrogen at 500 p.s.i.g. and the temperature raised to 300° F. The autoclave was then pressurized at 1000 p.s.i.g. for 8 hours. Thereafter, the autoclave was depressurized and cooled to room temperature. This procedure was repeated with a fresh solution. The treated chips, upon removal from the autoclave, were sulfided in a hydrogen sulfide stream at 700° F. for 6 hours to convert the nickel and tungsten compounds to their corresponding sulfides.

149 grams of the prepared catalyst material was used in the hydrogenation of an unrefined naphthenic pale oil obtained from Gulf crude conducted at an average temperature of about 750° F., at 1000 p.s.i.g., at a space velocity of 1 v./v./hr. and at a hydrogen recycle rate of 5000 s.c.f./bbl. By reason of the treatment, the sulfur content was substantially reduced from 0.22 in the charge stock to about 0.08 in the product.

EXAMPLE X 5.2 grams of sodium hydroxide and 3.5 grams of aluminum were dissolved in 65 milliliters of water. A stainless steel tube, designated ¼" iron pipe size, containing 18% by weight chromium and 8% by weight nickel, measuring 42 inches and having an inside diameter of 0.364 inch was used as the reactor for this example. The tube was filled with the sodium aluminate solution and allowed to stand overnight. The solution was then drained from the tube, and the tube was heated in air at 200° F. for ½ hour, than at 500° F. for ½ hour and then at 1000° F. for one hour.

A catalyst containing solution was prepared by dissolving 7.7 grams of nickel hexahydrate in 3 milliliters of water and adding the solution to 9 milliliters of ammonium hydroxide (15.1 N). In a second solution, 3.6 grams of tungstic acid were added to 19 milliliters of water and 18 milliliters of ammonium hydroxide were added thereto. The two solutions were combined. The tube was filled with the resulting solution and permitted to stand for about one or two minutes. The tube was drained, heated to 250° F. for ½ hour and then cooled to about room temperature. This soaking procedure was repeated until substantially all the solution was absorbed by the alumina film. When this soaking procedure was completed, the tube was heated first at 250° F. for ½ hour, then at 500° F. for ½ hour, and then at 1000° F. for 1 hour. The tube, having the catalyst material impregnated therein, was sulfided in the hydrogen sulfide stream at 700° F. for 4 hours to convert the nickel and tungsten compounds to their corresponding sulfides.

The prepared tubular reactor was used in the hydrogenation of a cycle gas oil at about 755° F. at 1000 p.s.i.g., at a liquid space velocity of 1 v./v./hr. and a hydrogen recycle rate of 5000 s.c.f./bbl. By reason of the catalytic treatment, the sulfur content was reduced from 0.22% by weight in the charge stock to 0.03% in the product.

EXAMPLE XI

A sodium aluminate solution was prepared by dissolving 586 grams of sodium hydroxide in 10 liters of water contained in a battery jar, and adding thereto 384 grams of aluminum pills. A round 6 mil metal knitted mesh consisting of a nickel-chromium-iron alloy and marketed under the trademark Inconel by Metal Textile Corp., was wrapped on a stainless steel screen measuring 6 inches by ten inches and was then rolled into a cartridge 6" in length and 2" in diameter. The metal mesh cartridge, which weighed 183 grams, was immersed in the sodium aluminate solution maintained at about 150° F. The cartridge was rotated periodically and remained in the solution for 20 hours in order that the metal mesh might be uniformly coated with alumina. The cartridge was then removed from the solution, and washed thoroughly with water. The cartridge, having an adherent film of alumina formed thereon, was dried at 300° F. for 1 hour, then at 500° F. for 1 hour, and finally at 1000° F. for 1 hour. As a result of the drying and heating, the alumina film comprised essentially gamma alumina. The total weight of the cartridge was 252 grams, the alumina film weighing about 69 grams.

The alumina film formed on the metal mesh cartridge was impregnated with a vanadium oxide catalyst material as follows:

The solution of catalyst containing material was prepared by first dissolving 115 grams of tartaric acid in 900 milliliters of water. To this solution was added 50 grams of ammonium vanadate, and the resulting solution was diluted to 1000 milliliters. The above prepared metal mesh cartridge was immersed in 400 milliliters of the resulting solution for 10 minutes at about 70° F., and the solution then drained. The cartridge was then heated at 300° F. for 1 hour in air. This procedure was repeated eight times. After the final soaking, the treated cartridge was heated in air at 300° F. for 1 hour, then at 500° F. for 1 hour, and subsequently at 1000° F. for 1 hour. The total weight for the cartridge was 267 grams.

EXAMPLE XII

A metal mesh cartridge as employed in Example XI was coated with a film of gamma alumina as described above. The final weight of the cartridge was 244 grams, the weight of the alumina film being about 61 grams.

A catalyst containing solution was prepared by dissolving 121 grams of copper nitrate trihydrate and 200 grams of chromic nitrate nonahydrate in 1000 milliliters of water.

The metal mesh cartridge was immersed in 195 milliliters of the above prepared solution for 10 minutes at about 70° F. The solution was then drained, and the cartridge was dried at 300° F. for 1 hour in air. This procedure was repeated 4 times, except after the fourth soaking, the cartridge was heated in air at 300° F. for 1 hour, then at 500° F. for 1 hour, and then at 1000° F. for 1 hour. The total weight for the cartridge was 253 grams.

Each of the prepared catalytic structures employed in Example XI and XII above were evaluated for use as an oxidation catalyst in the exhaust system of an ASTM-Coordinating Fuel Research engine (a single cylinder engine), using premium grade motor gasoline containing 2.2 milliliters of tetraethyl lead per gallon. In making the evaluation, a catalytic structure prepared in the above examples was contained in a chamber and inserted about midway in the exhaust pipe. The ports of the carburetor were opened so that the fuel to air ratio was about 0.062. A blank run was conducted employing no catalytic material. In each run, an analysis of the exhaust gases was made with a flame ionization analyzer detector manufactured by Carad Corporation. In the run employing no catalyst, an analysis of the exhaust gases showed a hydrocarbon content as carbon atoms per million (c.p.m.) of about 3600 at 800° F. and about 4000 at 950° F. When the catalytic cartridge of Example XI was employed, the hydrocarbon content as c.p.m. decreased to 2600 at 800° F., and to 1600 at 950° F. In testing the catalytic structure of Example XII, the hydrocarbon content as c.p.m. decreased to 1600 at 800° F., and 600 at 950° F.

EXAMPLE XIII

Two hundred and fifty grams of chrome steel chips were coated with alumina as in Example I. The alumina-coated chips were heated in air for one-half hour at 250° F., for one-half hour at 500° F. and for 2 hours at 1000° F. The total weight of the coated chips after calcining was 280 grams.

The chrome steel chips were dipped in 76 milliliters of an aqueous solution of chromic oxide prepared by dissolving 75 grams chromic oxide in 50 milliliters of water. After standing overnight, the excess solution was drained off and the impregnated turnings were placed in a muffle furnace and heated at 250° F. for one-half hour, at 500° F. for one-half hour, and at 1000 F. for two hours. After cooling, the total weight was 293 grams.

The above catalyst, designated catalyst "A" in the following table, was evaluated for dehydrogenation of cetane and results were compared with those obtained under comparable conditions with a commercially available chromia-alumina dehydrogenation catalyst in the form of ⅛ inch pellets containing 20 weight percent chromium trioxide and 80 weight percent alumina and designated catalyst "B" in the following table.

*Dehydrogenation of cetane*

| Run Number | 1 | 2 | 3 | 4 |
|---|---|---|---|---|
| Catalyst | A[1] | B[2] | A[1] | B[2] |
| Charge | Cetane | | | |
| Temp., °F | 1,000 | 1,000 | 1,100 | 1,100 |
| LHSV[3] | 2.0 | 2.0 | 4.0 | 4.0 |
| Liquid Yield, Wt. percent of Charge | 86 | 64 | 71 | 61 |
| Liquid Product Double bonds per molecule: | | | | |
| $C_6$'s | | | 1.1 | 0.9 |
| $C_7$'s | | | | 0.7 |
| $C_8$'s | | | 1.1 | 0.7 |
| $C_9$'s | | | | 0.7 |
| $C_{11}$'s | | | 1.0 | 0.8 |
| $C_{13}$'s | | | | 0.7 |
| $C_{15}$'s | | | 0.7 | |
| $C_{16}$'s | | | 0.02 | 0.2 |
| Off-Gas Composition, Wt. percent: | | | | |
| Hydrogen | 0.5 | 6.0 | 0.2 | 1.2 |
| Methane | 8.6 | 8.0 | 8.3 | 8.7 |
| Ethylene | 26.6 | 14.5 | 28.4 | 21.9 |
| Propylene | 22.6 | 16.7 | 24.1 | 22.2 |
| Butylene | 10.6 | 11.1 | 11.7 | 11.6 |
| Charge converted to carbon, wt. percent | | | 0.06 | 1.8 |

[1] $Cr_2O_3$-$Al_2O_3$-coated stainless steel chips.
[2] Commercial $Cr_2O_3$-$Al_2O_3$ tablets.
[3] Liquid hourly space velocity, volumes feed per volume of catalyst per hour.

EXAMPLE XIV

A potassium aluminate solution was prepared by dissolving 47 grams of potassium hydroxide in a sufficient amount of water to give 500 milliliters of solution. To this solution, 20 grams of aluminum pills were added and placed on a steam plate. A 12 gram piece of rolled Monel metal mesh was immersed in the solution and the solution maintained at about 180° F. for about three and one-half hours. An additional 50 grams of aluminum pills were added to the solution and left overnight on the steam plate. The following morning, alumina-coated mesh was removed from the solution, washed with water, placed in an oven and calcined for 1 hour at 300° F., 1 hour at 500° F., 1 hour at 750° F., and 1 hour at 1000° F.

The alumina-coated mesh, after calcining, weighed 59 grams, indicating a deposit of alumina in the amount of 47 grams. The alumina-coating appeared uniform, dense and smooth and was resistant to abrasion.

We claim:
1. A process for the catalytic chemical reaction of a fluid hydrocarbon material which comprises subjecting said hydrocarbon material to catalytic chemical reaction conditions while passing said hydrocarbon material through an iron-containing metal tube having an alumina-supported catalyst on its inner surface prepared by depositing an alumina film on the inner surface of said iron-containing metal tube by contacting said inner surface of said tube with an aqueous solution of an alkali metal aluminate, calcining the resulting film of alumina, and impregnating said alumina film with an additional catalyst material.

2. A process according to claim 1 wherein the catalytic chemical reaction is hydrogenation and the catalytic chemical reaction conditions are hydrogenation conditions.

3. A process according to claim 2 wherein said catalyst material consists essentially of the sulfides of nickel and tungsten and wherein said sulfides are formed on said alumina film by impregnating said alumina film with an ammoniated solution of nickel and tunsten compounds capable of thermal conversion to the oxide forms, thereafter calcining said impregnated alumina film and finally sulfiding the nickel and tunsten material.

4. A process for the dehydrogenation of hydrocarbons which comprises contacting said hydrocarbons under dehydrogenation reaction conditions in the presence of a catalytic structure comprising a dehydrogenation catalyst deposited on an alumina-coated metal support comprising iron, said structure prepared by depositing an alumina film on said metal support by contacting said metal support with an aqueous solution of an alkali metal aluminate, calcining the resulting alumina film, and impregnating said alumina film with said dehydrogenation catalyst.

5. A process according to claim 4 wherein said dehydrogenation catalyst comprises chromia.

6. A process according to claim 4 wherein said hydrocarbons consist essentially of cetane.

References Cited by the Examiner

UNITED STATES PATENTS

| 2,730,434 | 1/1956 | Houdry | 252—477 |
| 2,742,437 | 4/1956 | Houdry | 252—477 |
| 2,965,583 | 12/1960 | Houdry et al. | 252—477 |

DELBERT E. GANTZ, *Primary Examiner.*

ALPHONSO D. SULLIVAN, *Examiner.*